Feb. 20, 1940. W. T. BITLER ET AL 2,190,692
PORTABLE SPOT-WELDING MACHINE
Filed Sept. 6, 1935 4 Sheets-Sheet 3

Fig. 3.

INVENTORS
William T. Bitler
John R. Bower
Ray P. McBride
BY
ATTORNEY

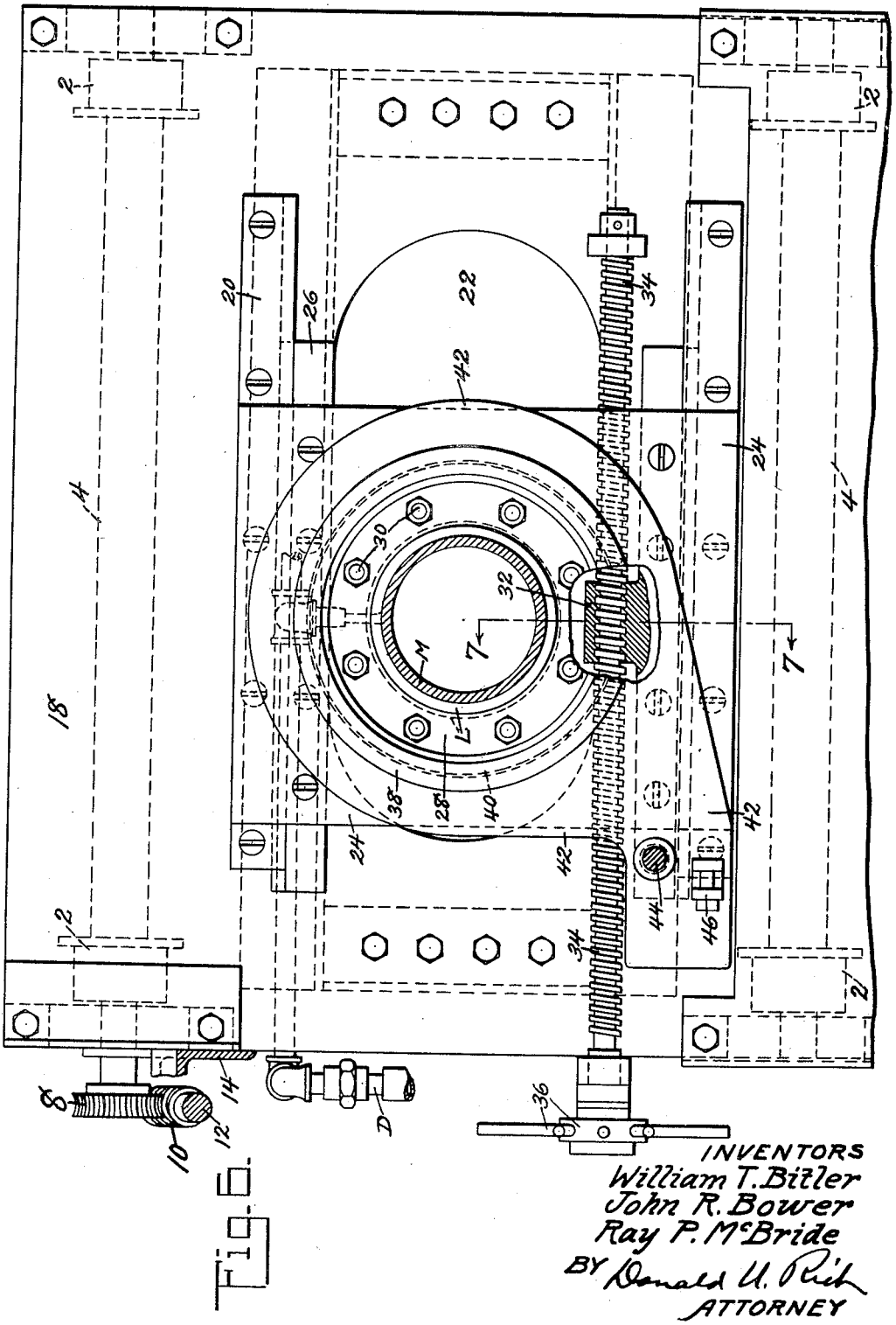

Patented Feb. 20, 1940

2,190,692

UNITED STATES PATENT OFFICE 2,190,692

PORTABLE SPOT-WELDING MACHINE

William T. Bitler, John R. Bower, and Ray P. McBride, Berwick, Pa., assignors to American Car and Foundry Company, New York, N. Y., a corporation of New Jersey Application September 6, 1935, Serial No. 39,386

6 Claims. (Cl. 219—4)

This invention deals with portable spot-welding machines in general and in particular with spot-welding machines adapted to be run on rails.

In the spot welding of railway cars, especially of the streamlined type, it is necessary that great flexibility of the unit be obtained, since the widths of the cars, heights of the parts to be welded, and the angularity of the parts, both vertically and horizontally, vary greatly on various cars or even on the same car. It is also necessary that the various positions for welding be located quickly, accurately and with a minimum amount of labor.

It is an object of this invention to provide a portable spot-welding machine.

It is a further object of this invention to provide a portable spot-welding machine, the longitudinal movement of which may be quickly and accurately located.

Another object of this invention is the provision of a portable spot-welding machine which is vertically movable any predetermined amount.

A further object of the invention is the provision of a spot-welding machine in which the power actuated electrode may assume a plurality of angular positions.

A further object of the invention is the provision of a portable spot-welding machine in which the electrode carrying frame may rotate about a vertical axis.

A still further object of the invention is the provision of a portable spot-welding machine in which the transformer, operator and controls are vertically movable in unison.

These and other objects will be apparent to one skilled in the art of spot-welding and car construction from a study of the following description in conjunction with the accompanying drawings in which:

Fig. 3 is an elevational view of the control end of the machine, being the end opposite that shown in Fig. 1;

Fig. 4 is an enlarged plan view of a portion of the machine and taken on line 4—4 of Fig. 2;

Fig. 5 is an enlarged plan view of certain controls and being taken on line 5—5 of Fig. 3;

Fig. 6 is a sectional view taken on line 6—6 of Fig. 3 and showing the longitudinal and traversing means; and Fig. 7 is a sectional view taken on line 7—7 of Fig. 6 showing details of the rotatable heads.

Figure 1:
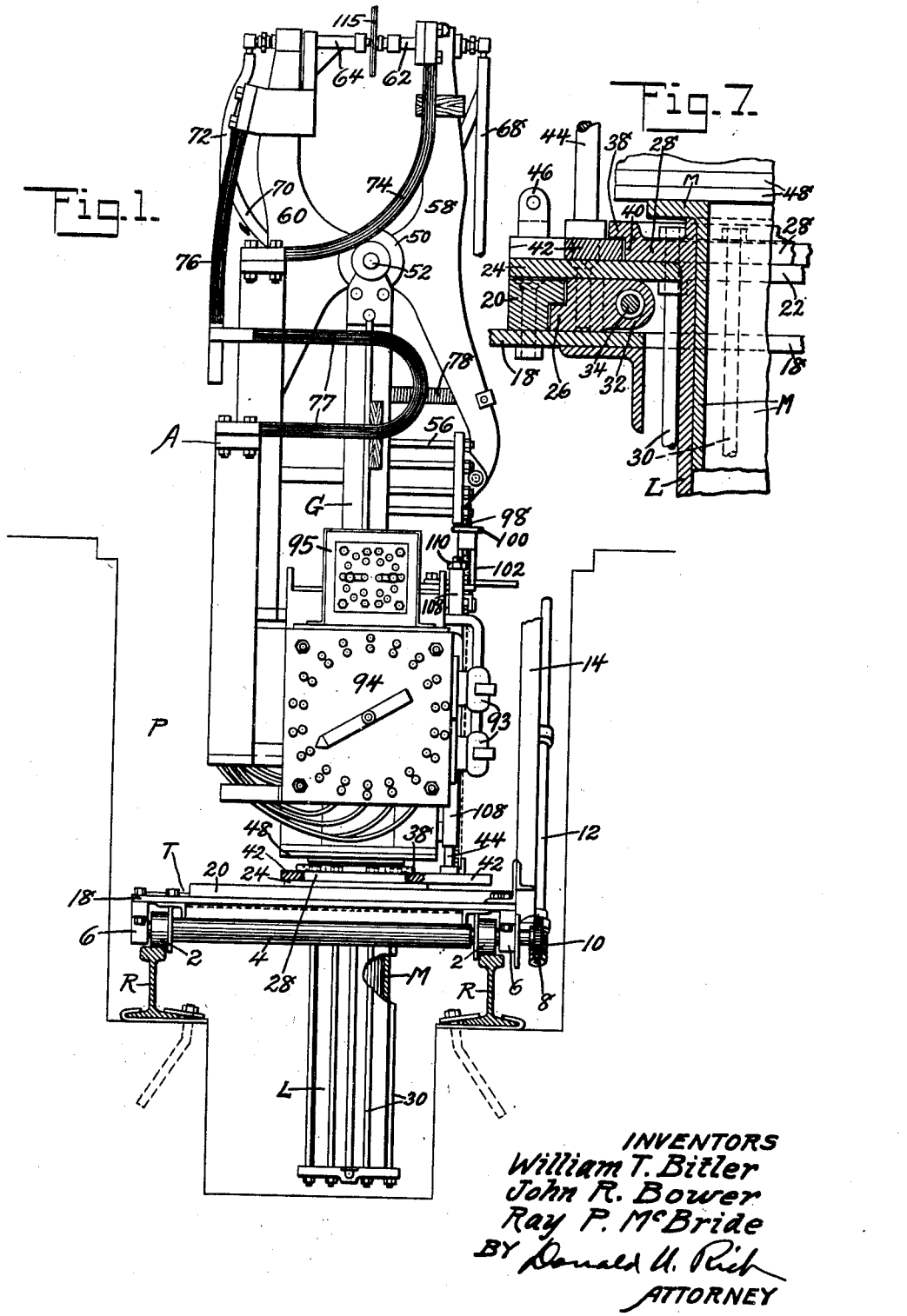
Figure 1 is an elevational view of one end of the welding machine, the same being shown as located in a construction pit.
Figure 2:
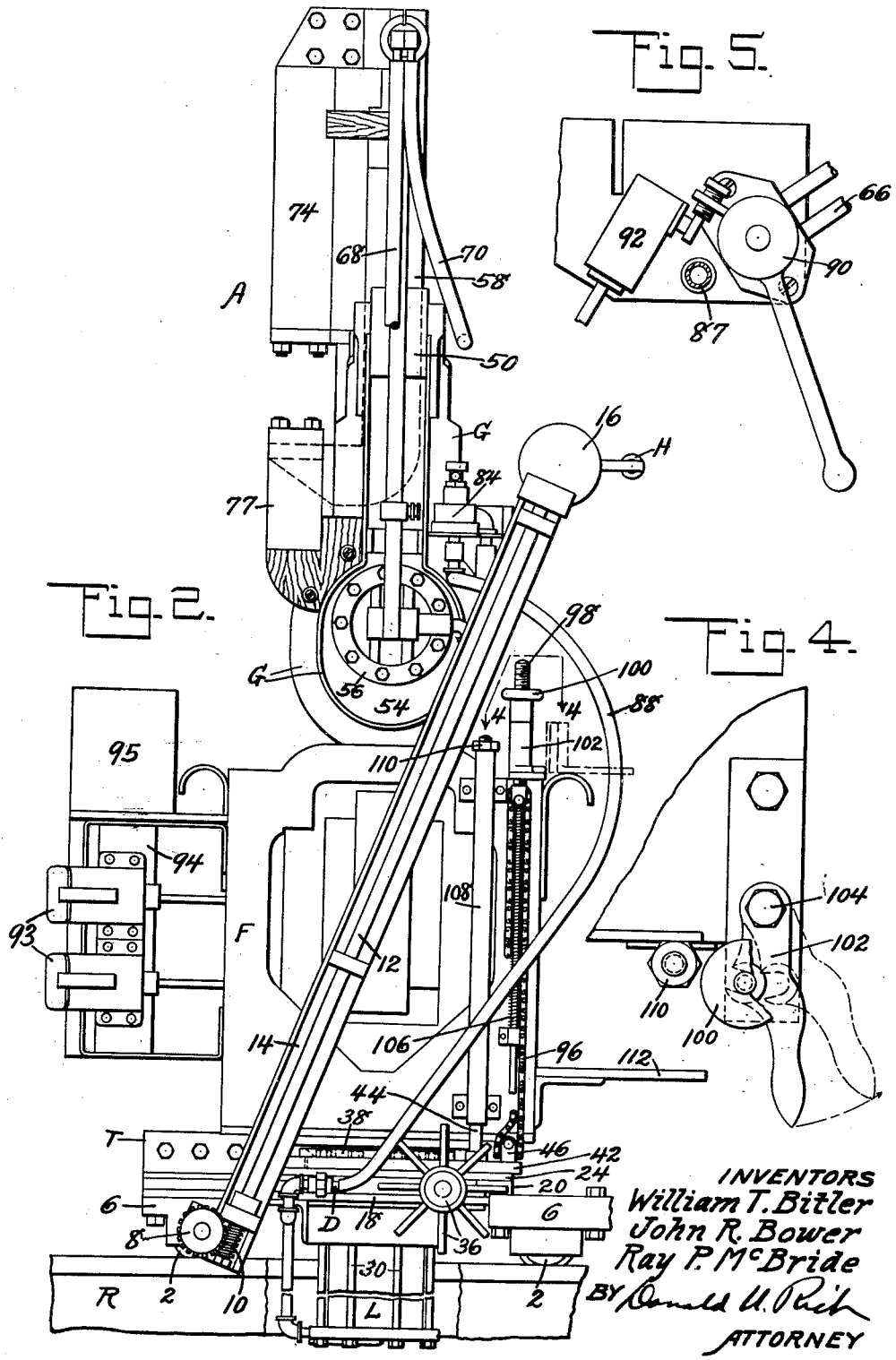
Fig. 2 is an elevational view of one side of the welding machine, portions of the hoist cylinder being omitted.

Referring now to the drawings in detail, the machine A is shown as supported on rails R which are arranged in a pit P built alongside the usual construction pit (not shown). The supporting truck T is carried on wheels 2 and axles 4 carried in bearing blocks 6. The end of one of the axles is extended beyond the bearing to carry a worm wheel 8 adapted to mesh with a worm 10 connected to a shaft 12, carried by an angle support member 14 rigidly fastened to the truck frame. The support carries at its upper end a housing 16 enclosing bevel or other gearing by which the hand crank H is connected to the shaft, thus permitting the operator of the crank to cause rotation of the axle. The truck is formed of angle or other side members connected to bearing blocks and joined by a flat plate 18 upon which is securely mounted guide members 20 paralleling a central opening 22 in the plate. A crown plate 24 rests upon the guide members and is provided on its lower surface with secured guide strips 26 adapted to interlock with the guide members, thus permitting relative horizontal movement between the crown and truck plate. The crown plate has secured thereto a cylinder plate 28 forming a shoulder of the lift air cylinder L, suitably braced by bolts 30. One of the guide strips is provided with an internally threaded projection 32 adapted to engage a screw 34 operated by hand wheel 36, thus permitting transverse horizontal movement of the machine with the lift cylinder depending through the slot or opening 22. Flexible hose connections D are provided to permit the feeding of air or other fluid to the cylinder. The cylinder shoulder 28 has formed thereon a lip or projection 38 which overlaps a circular bearing portion 40 about which plate 42 is rotatable. This rotatable plate rests directly on the plate 24, being held in place by the lip, and carries a projection to which is fastened rod 44 and chain securing means 46. Thus it is seen that this plate with the rod and chain securing means is rotatable about the cylinder yet cannot be displaced vertically.

The cylinder has fitted therein a piston M to which is secured a cap or base plate 48 carrying a transformer E suitably mounted in a frame F. Rigidly secured to this frame is a standard G formed at its upper portion with a bifurcated end 50 in which is journaled a pin 52. This standard has the intermediate portion enlarged to form an opening 54 within which the pressure cylinder assembly 56 is freely movable.

Mounted upon the pivot pin 52 are heavy pressure jaws 58 and 60 carrying at their upper ends suitably insulated electrodes 62 and 64 and at their lower ends being coupled to the piston and cylinder respectively of the pressure cylinder which is fed fluid through flexible line 66. The electrode tips are cooled by water which in the instance shown flows into electrode 62 through hose 68 out through hose 70 to electrode 64, from which it is discharged by hose 72. Current is fed to the electrodes by flexible laminated copper leads 74, 76 and 77 respectively, which are suitably coupled to the low voltage side of the transformer. In order to constantly urge one of the electrodes toward the work and to maintain the pressure jaws in the vertical position a spring 78 is provided coupled to the standard at one end and to jaw 58 at the other. Since the jaws are freely movable upon the pivot pin 52 it is obvious that the spring will transmit its pull through jaw 58 and operator 56 to the jaw 60 which will cause the electrode 64 to be urged toward the material.

Fluid pressure for the operation of the machine is fed through hose 80, strainer 82 and suitable couplings to control valve 84 and adjustable reduction valve 86. The lift control valve 84 permits admission of air to and exhaust of air from the lift cylinder through hose 88, suitable couplings and flexible connection D. A branch line 87 from the reduction valve goes to the pressure gage 89 and jaw control valve 90 from which air is fed to pressure cylinder assembly by the flexible connection 66 previously mentioned. Suitable cylinder lubricating means 91 is provided and coupled to the system in a well known manner. The valve 90 is so formed as to admit reduced air pressure to the cylinder upon the initial movement of the valve, further movement of the valve handle causes the switch 92 to trip turning on the current to the primary coils.

Electricity is fed to the primary coils by cables plugged into receptacles 93 and the current flow is under control of the tap changer 94 and time limit device 95, all in an obvious manner. It is sufficient to state that upon closing the switch 92 the time limit device functions to trip and shut off the primary current after a predetermined time interval and can only be turned on again by releasing and again closing the switch 92. The limit device may be of either the time interval or energy control type.

In order to provide control over the height to which the transformer may be lifted a chain 96 is fastened to member 46 and has its other end adjustably fastened to member 98, the upper end of which is threaded and carries hand wheel 100, the rotation of which gives a very close adjustment of the chain length and therefore the height to which the welder may be hoisted. A stop 102 is pivoted to the frame at 104 and may be swung either into a position under wheel 100 or to clear the wheel. This stop provides for a quick predetermined shift in vertical height and may, if several rows of welds are necessary, be made with several steps, thus definitely fixing the vertical shift of the machine. A spring 106 is provided which will counteract the weight of the chain and allow the operator to easily and quickly change adjustments, either by rotation of the wheel or through swinging of the stop. Tube 108 is welded to the frame and slidably carries the rod 44 screwed into the rotatable plate; thus the plate is caused to rotate with the frame relieving the chain of any strain and the frame is also guided vertically relieving the piston of any side strain. Retaining nut 110 may be threaded on the upper end of rod 44 and will retain the machine in its lowered position for transport.

An operator's platform 112 is provided from which the controls may be easily reached and which will maintain the operator in constant relation with the controls throughout movements of the machine.

The operation of the machine is believed to be obvious but will be described. Rotation of hand crank H will cause rotation of the axle and movement of the machine along the rails and, since this is a positive drive, then a definite rotation, say one turn of the crank, will shift the machine a predetermined amount of say one inch for making longitudinal welds.

Rotation of the hand wheel 36 will cause a longitudinal shift of the machine in a direction at right angles to the movement caused by the hand crank. It is obvious that this also being a straight drive may be so formed as to give a definite known lateral movement of the machine for a certain hand wheel movement during the making of transverse welds.

The entire machine is lifted relative to the truck for making vertical welds by admitting air to the lift cylinder and the extent to which the machine is lifted will be governed by the length of chain between member 46 and 98. Assuming that two rows of welds are desired a fixed distance apart, then the machine would be lifted till the chain was taut and one weld made, then stop 102 would be swung out of the way and the other weld made. This arrangement permits, as stated, a quick, accurate and predetermined vertical shift of the machine and more predetermined points of shift may be obtained by use of either stepped or multiple stops.

The welding or pressure jaws being freely swingable in unison about the pin 52 permits the electrodes to be always at right angles to the material such as 115 which is to be welded. The pressure cylinder is, of course, chosen of sufficient size and stroke to give the desired pressure and jaw opening, and since the jaws are mounted for mutual rotation about the pin 52 the welding material will be gripped equally by the electrodes without any distortion of the material for the entire jaw assembly may float freely about the pin.

The entire machine is rotatable about a vertical axis due to the fact that it is balanced on the lift cylinder and that plate 42 is rotatable with respect to the truck. No positive means for rotation of the machine has been shown, but it is obvious that, when desirable, such may be readily applied in any well known manner.

Assuming the machine in position for a weld to be made, the valve 90 is operated to close and clamp the jaw electrodes upon the material, further movement of the valve handle turns on the switch 92 and the weld is made with the circuit broken either after a definite time interval or after a definite amount of energy has been dissipated.

From the above rather detailed and purely illustrative description it is believed obvious to one skilled in the art that various modifications or improvements of the device may be made without departing from the scope of the following claims which, rather than the description, define the scope of applicants' invention.

What is claimed is:

1. A portable spot-welding machine comprising in combination a supporting truck, a frame, movable electrode jaws pivoted to said frame on a substantially horizontal axis for mutual rotational movement relative to the frame, and means supporting the frame on said truck for rotation about a substantially vertical axis.

2. A portable spot-welding machine comprising in combination, a supporting truck, a frame, a transformer carried by the frame, electrodes supported by the frame for mutual rotational movement in vertical planes, said electrodes having connections to said transformer for the supply of welding current and means supporting said frame on said truck for translational and rotational movement relative thereto.

3. In a portable spot-welding machine adapted to run on rails the combination of a truck, a frame, a transformer carried by the frame, electrodes connected to said transformer and supported by said frame for mutual rotational movement relative to the transformer in a vertical plane and means supporting said frame on said truck for substantially universal movement relative thereto.

4. A portable spot-welding machine comprising in combination, a supporting truck, a frame, electrodes connected to said frame for mutual movement relative thereto, hoist means supporting said frame on said truck, and check means connecting said frame and truck to limit the vertical movement of said hoist means.

5. A portable spot-welding machine comprising in combination, a supporting truck, a frame, a transformer carried by said frame, mutually movable electrode jaws, electrodes carried by said jaws, relatively short conductors connecting said electrodes to said transformer for passage of welding current, means pivotally supporting said jaws on said frame and providing a horizontal axis about which the jaws may move, means supporting said frame on said truck for transverse and rotational movement about a vertical axis relative to the truck, said axes being substantially at right angles to each other thereby permitting substantially universal movement of said electrodes.

6. A portable spot-welding machine comprising in combination, a supporting truck, a frame, a transformer carried by said frame, movable electrode jaws, electrodes carried by said jaws, relatively short conductors connecting said electrodes to said transformer for passage of welding current, means pivotally supporting said jaws on said frame for mutual movement relative to the frame, means supporting said frame on said truck for transverse and rotational movement relative to the truck, means for controlling said frame movements, said first and second named means comprising in part pivotal axes substantially at right angles to each other thereby permitting controlled substantially universal movement of said electrodes.

WILLIAM T. BITLER.
JOHN R. BOWER.
RAY P. McBRIDE.